Nov. 16, 1937.   J. D. LANGDON   2,099,405
RESILIENT LIGHT SOCKET AND BRACKET EXTENSION
Filed Feb. 15, 1937
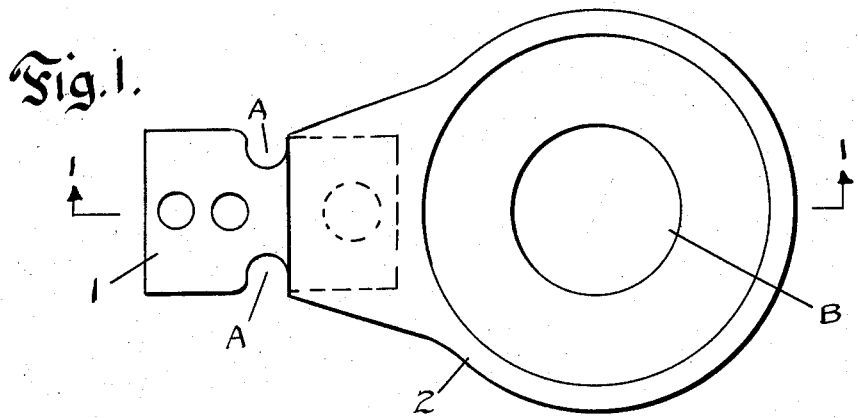
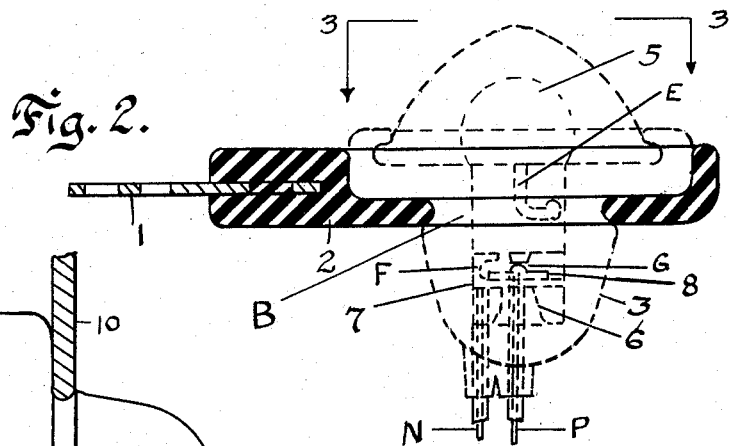
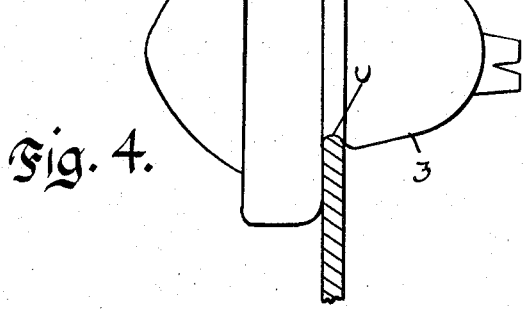
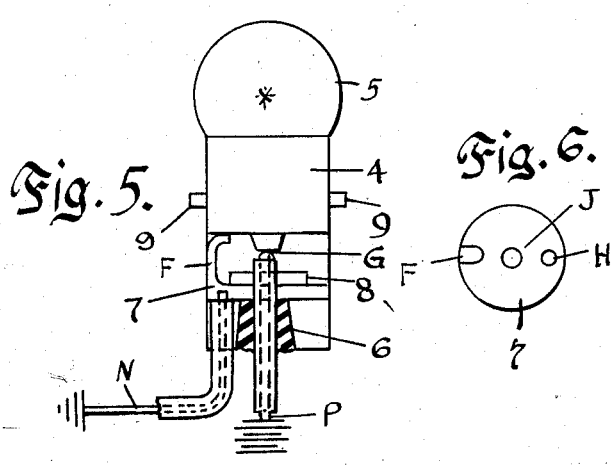
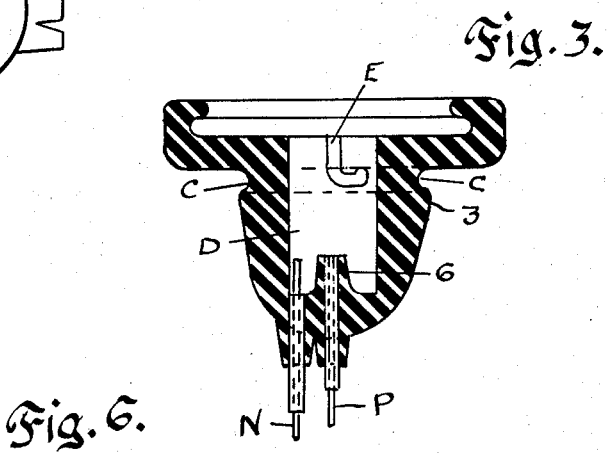
INVENTOR
BY *J. D. Langdon*
ATTORNEY Patented Nov. 16, 1937

2,099,405

UNITED STATES PATENT OFFICE 2,099,405

RESILIENT LIGHT SOCKET AND BRACKET EXTENSION

Jesse D. Langdon, Los Angeles, Calif., assignor of two-thirds to George J. Kilgen and Edward W. Todd, both of Los Angeles, Calif.

Application February 15, 1937, Serial No. 125,728

5 Claims. (Cl. 173—358)

My invention relates to improvements in light sockets made of resilient material adapted to deform for mounting in bracket extensions or various bodies having suitable apertures therethru to receive and retain a light socket, also to suitable bracket extension design for use with said light socket.

The primary object in my invention is to provide a light socket of resilient material capable of being forced into an aperture to retain the light socket in operative position.

Another object in my invention is to provide a light socket made entirely of resilient material capable of receiving and retaining an electric light globe without the necessity of using a metal socket.

Another object is to provide an electric light socket which can be molded of a single piece of resilient material, providing in combination a resilient internal extension lug to take the place of a spring to support circuit completing connections against a light globe shank, light globe receiving grooves to take the place of a metal socket, together with a lens retaining bezel, all molded in an integral unit.

Another object is to provide suitable electrical circuit connections in combination with a resilient light socket molded of a single piece of rubber without the necessity of using a metal socket.

A further object in my invention is to provide a flexible bracket extension of suitable form to receive a rubber light socket and securely retain the same for a swinging suspension, said extension separable from said resilient socket.

A still further object in my invention is to provide a light socket and a flexible bracket extension suitable for combined or separate use, and to facilitate replacement of parts.

Other and further objects will appear as the description proceeds as set forth in the specification and illustrated by the drawing, of which, Fig. 1 is a plan view of the flexible bracket extension.

Fig. 2 is a longitudinal section of the flexible bracket extension with the position of the lens, socket and light shown in dotted lines.

Fig. 3 is a sectional view of the rubber light socket molded of a single piece of material.

Fig. 4 illustrates the resilient light socket disposed through a fragmentary section of material.

Fig. 5 is an enlarged view of an electric light globe with a metal contact washer supporting an insulated contact washer held in contacting position by a fragmentary portion of the light socket extension lug.

Fig. 6 is a plan view of the metal contact washer.

The drawing is for the purpose of illustration only, and I do not confine myself to the exact showing thereof, except as I may be limited by the claims. It is evident that the form of my invention may be changed to suit the contingencies of use within the scope of the claims.

Fig. 1 represents a bracket extension having a metal attaching bracket 1 formed with notches A provided to permit easy bending or twisting in any direction necessary to meet the contingencies of use. The metal attaching bracket 1 extends into and is molded integral with a flexible extended portion 2 said portion 2 having an aperture B disposed therethrough suitably formed to receive a resilient electric light socket 3 and hold the same in the position illustrated in dotted lines as of Fig. 2.

Fig. 3 shows a section view of the resilient socket at 3—3 having a narrow neck portion C formed by a shallow external groove surrounding the external circumference of the resilient socket 3 adapted to be impinged by the material surrounding the aperture B of the flexible extended portion 2. A recess D is extended into the socket 3 to receive the shank 4 of electric light globe 5. An internal extension lug 6 is provided to support a ground wire contact 7 and live wire contact and insulation washer 8 against the shank 4 of globe 5 to establish an electric circuit. The pins 9 of shank 4 are adapted to enter grooves E two of which are molded opposite to one another disposed into the wall of recess D.

Fig. 4 illustrates the socket 3 after having been forced through a hole previously made of suitable size to receive said socket, which may thus be installed through any suitable material of the body to which the socket is to be attached.

The method of attaching or installing the light socket 3 independent of the bracket 2 consists of boring a hole through the material 10 approximately the same size as the neck portion C then forcing the bulbous end of resilient socket 3 through the hole. This eliminates the need of screws, bolts or any of the usual attaching means for other types of light sockets.

It will be seen that the resilient socket 3 is capable of being distorted sufficiently by pressure in such a manner to allow the socket 3 to be forced through a hole in the material 10. After being forced through the hole in the material 10 the bulbous portion of the socket 3 resumes its normal form holding itself in position as illustrated.

For use with the bracket extension 2, the bulbous portion of the socket 3 is forced through the aperture B, said extension 2 being preferably made of resilient material tends to exert a tension around the neck C of resilient socket 3. Thus it will be seen that by combining extension 2 and socket 3 to form a flexibly mounted resilient socket, a unit will be provided capable of being swung from any suitable object.

The notches A as of Fig. 1 reduce the breadth of the material of the metal bracket 1, providing a comparatively narrow section of metal which may be readily bent or twisted to any convenient angle or position necessary for installation or attachment.

Fig. 5, illustrating the light globe 5 having a shank 4 disposed against a metal washer 7 having a contact ear F, provides the means of establishing an electrical circuit which is completed by the contact point G extending through the insulating washer 8 surrounding and insulating the positive connection P. Thus the ear F and the contact point G are the means of completing an electrical circuit. The supporting lug 6 surrounds the positive connection C supports the metal washer 7 in contact with the shank 4 of globe 5. The insulating washer 8 is in turn supported by the metal washer 7.

Fig. 6 is a plan view of the metal washer 7, which has a hole H perforated therethrough to receive the negative or ground wire N, while the hole J permits the passage of wire P. The hole H may be perforated in any desired position.

Due to the fact that the bracket extension 2 is separate from the resilient socket 3, it is practical and convenient to have several molds adapted to make the extension 2 in various lengths. It will take a comparatively cheap mold to build the extension 2, while another set of molds can be used for the socket 3 for use with any of the various extensions made. Thus it will be seen that this arrangement greatly decreases the equipment cost as compared with that which would be necessary if bracket extensions of various lengths were molded integral with a light socket.

It will also be seen that due to the fact that the bracket extension 2 and the socket 3 are molded separately, the public will have the opportunity of purchasing a device adapted to different methods of installation when desired. For example, the socket may be hung with a flexible extension or may be inserted into any body where it is desired to use the same in the manner set forth, as of Fig. 4.

Further, a considerable saving is achieved in production costs due to the fact that the grooves E are molded integral within the socket 3 and the lug 6 takes the place of a spring to support the circuit completing connections 7—F and 8 in making contact G, saving cost of metal socket and spring.

Having described my invention and that which is new, I claim:

1. A resilient electric light socket, including means molded integral with said socket and of the same material as said socket to retain the shank of an electric light globe, and additional means molded integral with and extended into the recess of said socket to support electric circuit completing contacts against the shank of said electric light globe.

2. The combination of an electric light socket formed of a unitary piece of rubber-like material to receive the shank of an electric light globe and having an integral inwardly extending boss resilient enough to support and maintain contact between circuit completing connections disposed within said socket, and elements combined with said socket to hold the shank of said globe and said circuit completing connections in assembled relationship within said socket.

3. An electric lamp socket comprising a structure composed of rubber-like material resilient enough to resume its normal shape after being deformed, said socket formed with an annular wall having a bulbous external contour adapted to be compressed and deformed for insertion through an annulus, said socket portion adapted to be held in said annulus by the expanded contour of said bulbous portion.

4. A device as of claim 2, the circuit completing connections comprising a central contact member insulated from and disposed through a metallic contact member, both members adapted to contact the shank of the electric light globe to complete the circuit.

5. For use with a device of the class described, a double contact comprising an insulated central contact element disposed through a metallic washer having an upstanding contact terminus, both elements adapted to simultaneously contact the shank of an electric light globe.

JESSE D. LANGDON.